(12) United States Patent  
Ragonetti

(10) Patent No.: US 8,997,689 B2  
(45) Date of Patent: Apr. 7, 2015

(54) TREAT DISPENSER

(71) Applicant: Peter Ragonetti, Brooklyn, NY (US)

(72) Inventor: Peter Ragonetti, Brooklyn, NY (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 27 days.

(21) Appl. No.: 13/923,645

(22) Filed: Jun. 21, 2013

(65) Prior Publication Data

US 2014/0373788 A1    Dec. 25, 2014

Related U.S. Application Data

(60) Provisional application No. 61/663,153, filed on Jun. 22, 2012.

(51) Int. Cl.
*A01K 15/02* (2006.01)
*A63H 3/28* (2006.01)
*A01K 5/00* (2006.01)

(52) U.S. Cl.
CPC .............. *A01K 15/025* (2013.01); *A01K 5/00* (2013.01)

(58) Field of Classification Search
CPC .. A01K 15/025; A01K 15/026; A01K 5/0114
USPC ........ 119/51.01, 707, 709, 710, 711; 446/184
See application file for complete search history.

(56) References Cited

U.S. PATENT DOCUMENTS

| | | | | |
|---|---|---|---|---|
| 5,390,629 | A * | 2/1995 | Simone | 119/711 |
| 5,965,182 | A * | 10/1999 | Lindgren | 426/104 |
| 6,073,581 | A * | 6/2000 | Wang | 119/51.01 |
| 6,098,571 | A * | 8/2000 | Axelrod et al. | 119/707 |
| 6,470,830 | B2 * | 10/2002 | Mann | 119/709 |
| 6,484,671 | B2 * | 11/2002 | Herrenbruck | 119/707 |
| 6,557,496 | B2 * | 5/2003 | Herrenbruck | 119/707 |
| 6,722,317 | B2 * | 4/2004 | O'Rourke | 119/707 |
| 7,555,997 | B2 * | 7/2009 | Wolfe et al. | 119/707 |
| 7,833,079 | B2 * | 11/2010 | Willinger et al. | 446/184 |
| 7,866,281 | B2 * | 1/2011 | Willinger | 119/710 |
| 7,950,352 | B2 * | 5/2011 | Specht | 119/707 |
| 8,113,150 | B1 * | 2/2012 | Tsengas | 119/711 |
| 8,186,309 | B2 * | 5/2012 | Specht | 119/707 |
| 8,312,844 | B2 * | 11/2012 | Mann | 119/709 |
| 8,418,656 | B2 * | 4/2013 | Rutherford et al. | 119/707 |
| 8,746,182 | B2 * | 6/2014 | Anderson | 119/710 |
| 2005/0045115 | A1 * | 3/2005 | Mann | 119/711 |
| 2007/0068464 | A1 * | 3/2007 | Smith et al. | 119/709 |
| 2009/0038560 | A1 * | 2/2009 | Markham | 119/709 |
| 2013/0055965 | A1 * | 3/2013 | Valle et al. | 119/710 |

* cited by examiner

*Primary Examiner* — Yvonne Abbott-Lewis
(74) *Attorney, Agent, or Firm* — Eckert Seamans Cherin & Mellott, LLC; Brij K. Agarwal

(57) ABSTRACT

One embodiment of a treat dispenser for an animal comprises a first and second chamber separated at a junction of the chambers by a dividing wall, wherein each chamber is formed from a skeletal framework, wherein the skeletal framework of the first chamber is substantially open and the skeletal framework of the second chamber is substantially closed, and further comprising a sound device disposed within the second chamber.

11 Claims, 4 Drawing Sheets

TREAT DISPENSER

CROSS-REFERENCE TO RELATED APPLICATION

The instant application claims priority from U.S. Provisional Patent Application Ser. No. 61/663,153 filed Jun. 22, 2012, the disclosures of which are incorporated herein by reference.

BACKGROUND

1. Field

The invention relates to a treat toys for animals generally and, more particularly, to a treat dispenser having multiple chambers separated by a dividing wall, wherein one chamber is skeletal with a plurality of openings while the other substantially enclosed for receiving a sound device such as a squeaker.

2. Related Art

Pet toys that dispense animal treats when the toy is rolled or otherwise manipulated are generally known. Such structures have a variety of forms and arrangements of holes and openings These treat-discharging toys are generally comprised of a wall that forms a hollow body which is configured for rolling and which has an interior cavity and one or more openings being dimensioned and configured for passage of animal treats into and out of the cavity.

Many pets have a relatively short attention span and are easily bored. It would be desirable for a treat dispenser to sustains a pet's attention for longer periods of time than previous toys. What is needed is a new type of treat dispenser which dispenses treats differently from those already known, thereby sparking a pet's interest for longer periods of time.

SUMMARY

One embodiment of a treat dispenser for an animal comprises a first chamber and a second chamber separated at a junction of the chambers by a dividing wall, wherein each chamber includes a skeletal framework, wherein the skeletal framework of the first chamber is substantially open, and wherein the skeletal framework of the second chamber is substantially closed, and further comprising a sound device disposed within the second chamber. The skeletal framework of the first chamber both allows for the passage of treats into an interior and functions to retain treats within the interior. The interior of the second chamber is substantially hollow and the skeletal framework is flexible enough to enable a user to squeeze the second chamber to produce a sound from the sound device to entice a pet, which sound would also result from a pet compressing the second chamber through chewing or the like. Treats are inserted into the interior of the first chamber, and the treat dispenser is then either handed to a pet or may be any of thrown, rolled, or bounced to a pet. The pet proceeds to play with and attempt to extract inserted treats from the interior of the first chamber, while at the same time rolling, bouncing and generally playing with the treat dispenser that is also making noises from the sound device.

DETAILED DESCRIPTION

Figure 1:
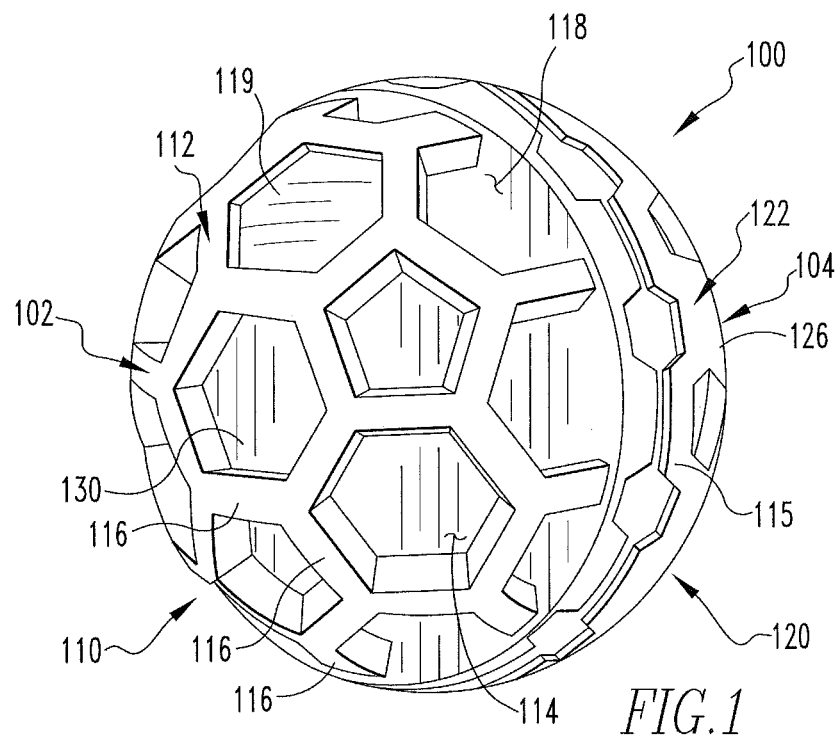
FIG. 1 is a perspective front view of a treat dispenser in accordance with the disclosed and claimed concept.

The description of illustrative embodiments according to principles of the disclosed and claimed concept is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and the like refer to a relationship wherein structures are secured or attached to one another, either directly or indirectly through intervening structures, as well as both movable or rigid attachments or relationships, unless expressly described otherwise. Moreover, the features and benefits of the disclosed and claimed concept are illustrated by reference to the exemplified embodiment. Accordingly, the invention is expressly not limited to such exemplary embodiment as illustrating some possible non-limiting combination of features that may exist alone or in combinations with other features. The scope of the invention is set forth in the claims.

This disclosure provides an example of the invention presented solely for illustrative purposes by reference to the accompanying drawings to advise one of ordinary skill in the art of the advantages and construction of the invention. In the various views of the drawings, like reference characters designate like or similar parts.

The embodiment described herein is only an example of one way in which the innovative teachings herein may be employed. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

In one embodiment, the present invention is directed to an animal treat dispenser to enable a pet or an animal to partially control the dispensing of treats from the device while also providing the animal with a toy as a means for enjoyment. A "treat" as used herein is meant to include all animal foodstuffs that can be consumed by an animal, and may take various forms such as uniformly sized nuggets, or the treat may be irregularly sized and shaped. Other shapes and configuration are possible.

Figure 6:
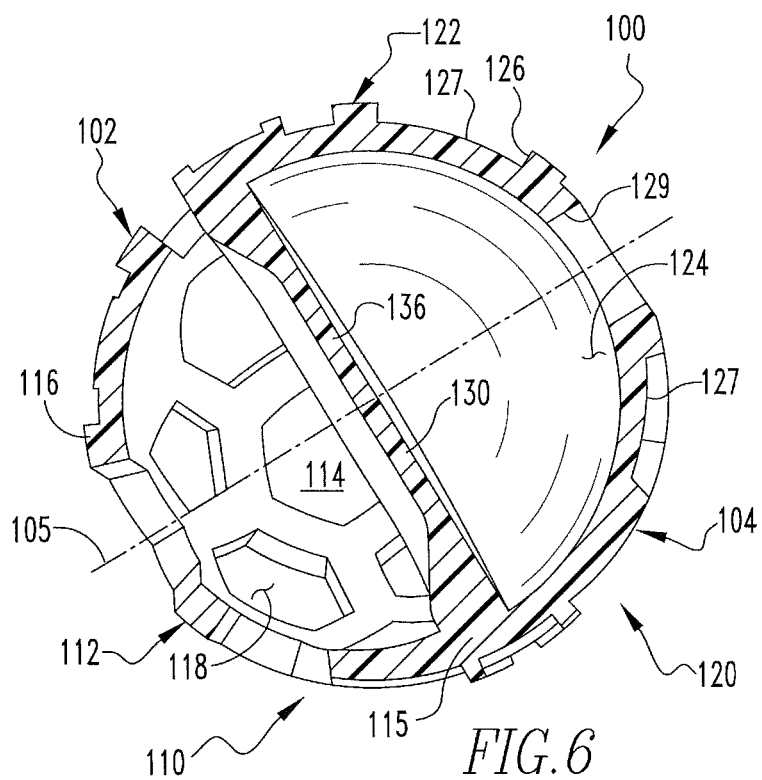
FIG. 6 is a sectional view as taken along line 6-6 of FIG. 2, except with the sound removed therefrom.

A treat dispenser 100 in accordance with the disclosed and claimed concept comprises a body 101 which comprises a first wall portion 102, a second wall portion 104, and a dividing wall 130 that are connected together. The first and second wall portions 102 and 104 are each of a generally semi-spherical shape and each have an exterior surface that is likewise of a generally semi-spherical shape to cause the treat dispenser 100 to have an overall generally spherical shape. A central axis 105 (FIG. 6) can be said to extend through the treat dispenser. A first chamber 110 and a second chamber 120 are separated at a junction 115 of the chambers 110, 120 by the dividing wall 130. The first chamber 110 is disposed generally between the first wall portion 102 and the dividing wall 130. The second chamber 120 is disposed generally between the second wall portion 104 and the dividing wall 130.

Figure 7:
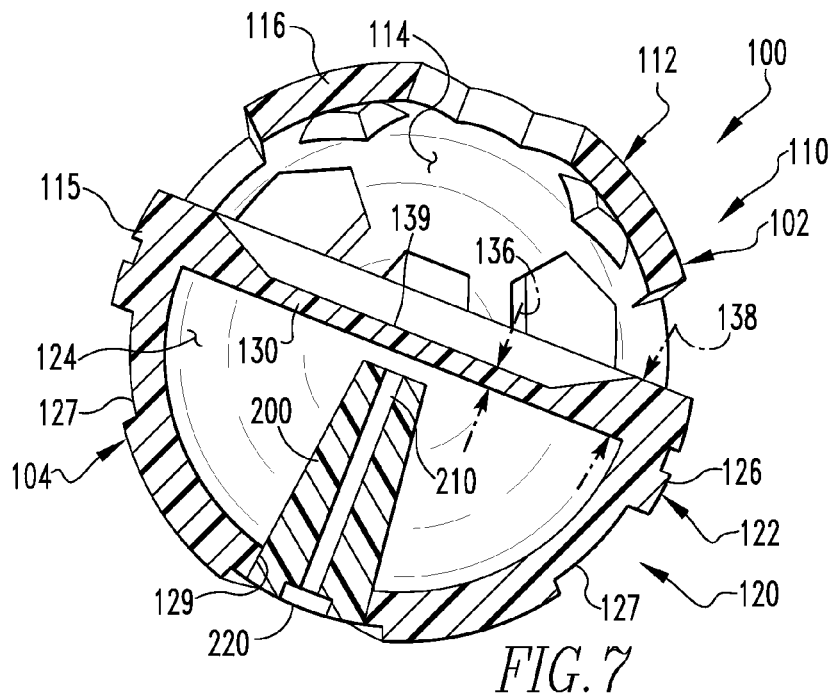
FIG. 7 is view similar to FIG. 6, except including the sound device.
Figure 8:
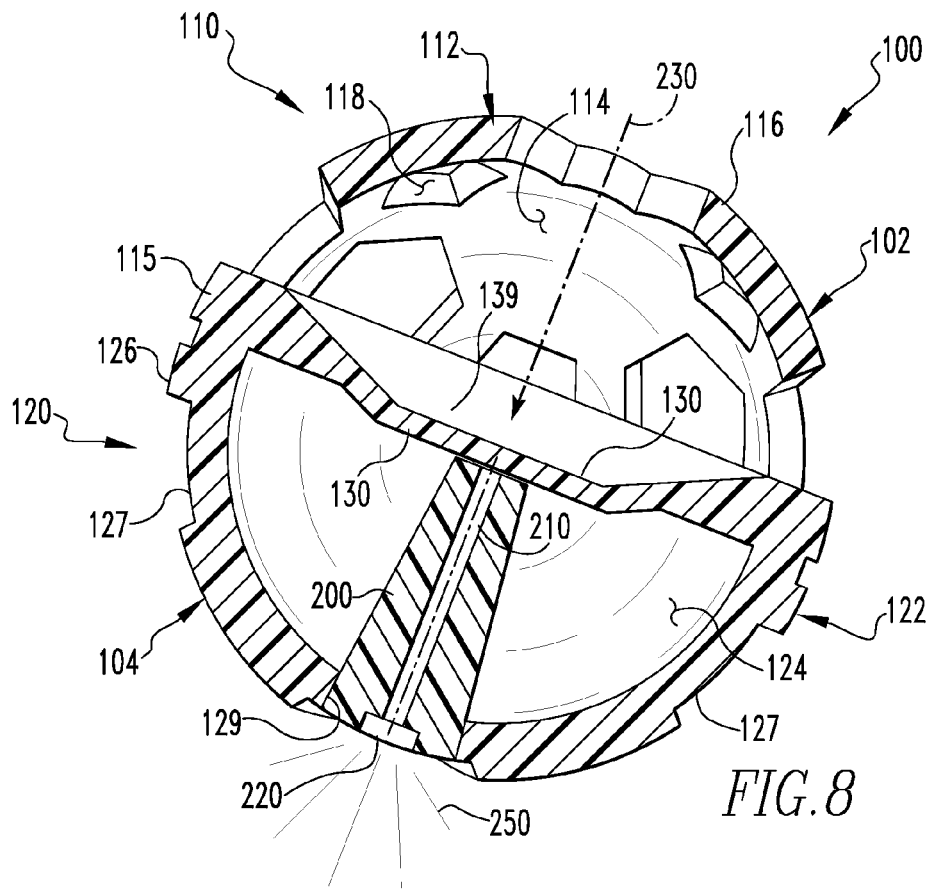
FIG. 8 is a view similar to FIG. 7, except depicting treat dispenser emitting a sound from the sound device.

The first wall portion 102 is formed from a skeletal framework 112 that allows for the passage of treats (not shown) into an interior 114 and that functions to retain treats within the interior 114. The second wall portion 104 is also formed from a skeletal framework 122 that substantially encloses an interior 124 (FIGS. 6-8) that is adapted to receive a sound device 200 in fluid communication with the interior 124. The sound device 200 has an inlet 210 and an outlet 220 as shown in FIGS. 7-8 and will be described in greater detail below. The interior 124 of the second chamber 120 is substantially hollow. The skeletal framework 122 is flexible enough to enable a user to squeeze the wall portion 104 or the dividing wall 130 or both to elastically and resiliently deform the second chamber 120 and to thereby operate the sound device 200 to produce a sound from the sound device 200 to entice a pet. Such a sound would also result from a pet deforming the second chamber 120 through chewing or the like. Treats are received into the interior 114 of the first chamber 110 and then the treat dispenser 100 is either handed to a pet or can be thrown, rolled, or bounced to a pet, whereby the pet proceeds to play with and attempt to extract inserted treats (not shown) from the interior 114 of the first chamber 110, while at the same time rolling, bouncing, and generally playing with the treat dispenser 100 and hearing noises emitted from the sound device 200.

Figure 3:
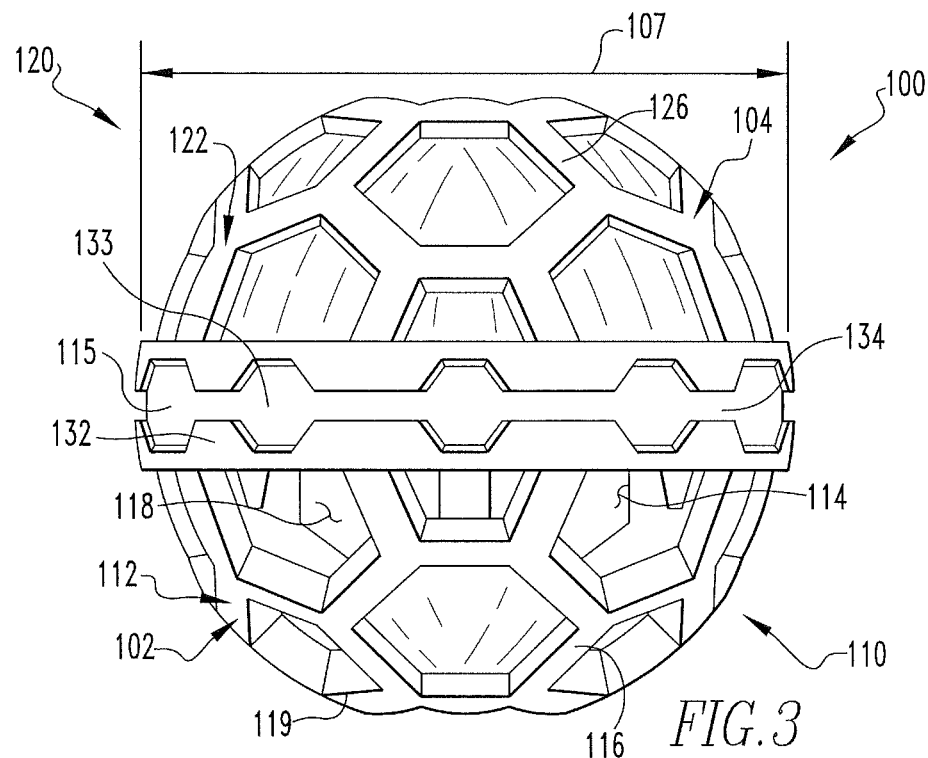
FIG. 3 is a top view of the treat dispenser of FIG. 1.
Figure 4:
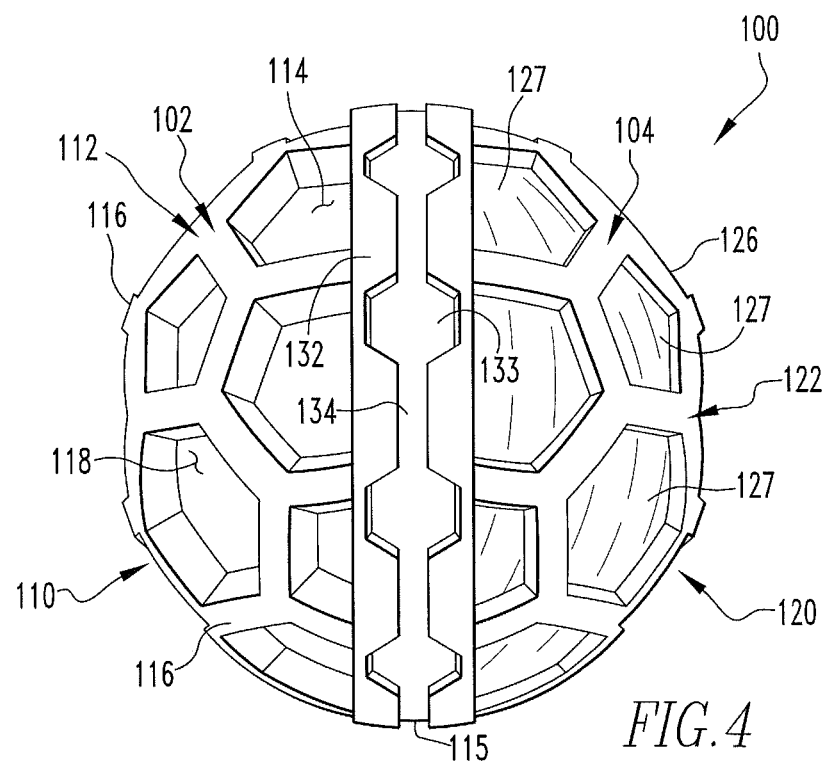
FIG. 4 is a right side view of the treat dispenser of FIG. 1.
Figure 5:
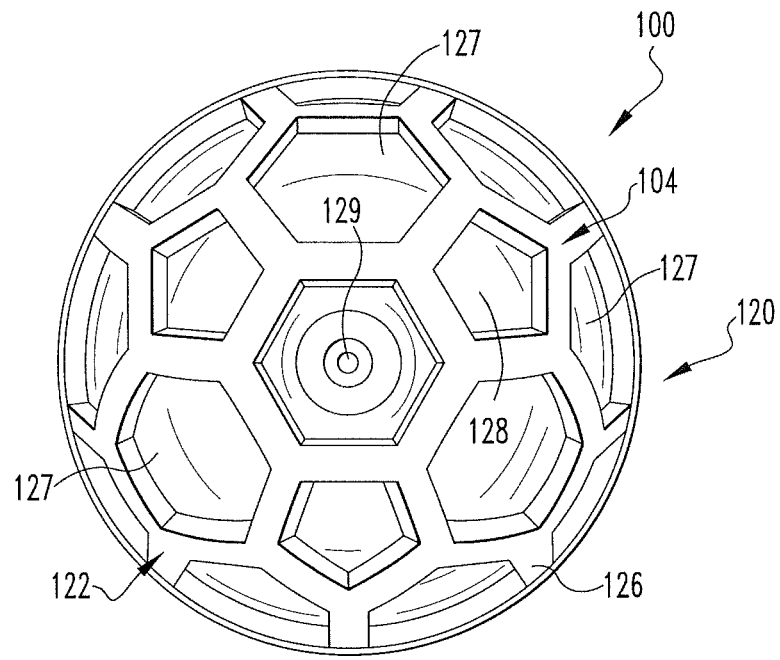
FIG. 5 is a back view of the treat dispenser of FIG. 1 that depicts a sound device thereof.

In the illustrated embodiment, the skeletal framework 112, 122 is configured from a plurality of ribs 116, 126 between which are disposed a plurality of openings 118, 128 arranged in a substantially regular repeating pattern. While the illustrated embodiment shows a regular repeating pattern of hexagons and pentagons, it will be appreciated that such shapes are only illustrative and not meant to be limiting as other shapes may be used, or the same shapes may be used, of similar or varying sizes. Aspects of this pattern are also reproduced along an exterior 132 (FIG. 3) of the dividing wall 130 or of the junction 115 between the first and second chambers 110, 120, which shows an arrangement of spaced-apart hexagons 133 bisected by a central groove 134. The exterior 132 can be said to be a protruding element that protrudes radially outwardly from the body 101 beyond the exterior surfaces of the first and second wall portions 102 and 104. The exterior 132 is elongated and extends along a circumference of the body 101 and forms the outermost or largest diameter 107 (FIG. 3) of the treat dispenser 100. Such increased diameter in combination with the increased thickness of the junction 115 between the first and second chambers 110, 120, results in a strengthened central portion that resists compression relative to the second chamber 120, for example, and also imparts a discontinuity in the shape that makes rolling of the treat dispenser 100 somewhat erratic and thus more enjoyable for a pet.

In certain respects, a portion of the skeletal contour is similar to some of the rollable frames found in U.S. Pat. No. 6,622,659, the contents of which are incorporated herein by reference. In particular, the skeletal framework 112 of the first chamber 110 is primarily an open framework where most of the openings 118 provide a passage to the interior 114. The shape, thickness and cross-sectional contour of the ribs 116, 126, as well as the size and shape of the openings 118, 128, are variable.

Figure 2:
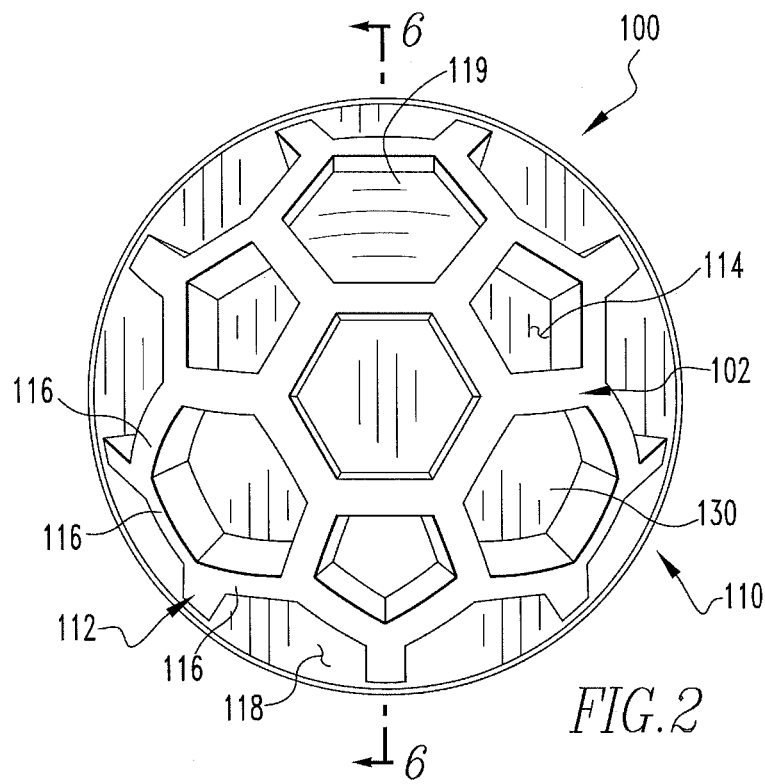
FIG. 2 is a front view of the treat dispenser of FIG. 1.

As shown in FIGS. 1 and 2, there is optionally provided at least one opening occlusion 119, which is in the form of a structure that largely occupies one of the openings 118 while still maintaining the skeletal appearance of the skeletal framework 112 surrounding the opening occlusion 119. In order to do so, the opening occlusion 119 has an exterior surface that is recessed slightly below the exterior surfaces the surrounding ribs 116 of the skeletal framework in the vicinity of the opening occlusion 119. The exterior surface of the opening occlusion 119 is of a partially spherical shape and that can include an advertising element. The opening occlusion 119 is formed from the same material as the ribs 116 and is configured to maintain and emphasize the contour of the surrounding ribs 116. While only one optional opening occlusion 119 is shown, it will be appreciated that more than one opening occlusion 119 may be provided, or that certain openings may only be partially occluded or the like without limitation. While such an opening occlusion 119 provides an advertising and marketing benefit, it also helps to retain treats inserted into the interior 114 through the other un-occluded openings 118. On the other hand, most or all of the openings 128 are occluded with a number of opening occlusions 127, whereby the skeletal framework 122 outside the second chamber 112 substantially encloses the interior 124. In the illustrated embodiment, the opening occlusions 127 in the skeletal framework 122 have outer surfaces that are recessed relative to their respective surrounding ribs 126. As will be described in more detail below, one opening 129 within the skeletal framework 122 is partially occluded and receives the outlet 220 of the sound device 200.

The depicted exemplary treat dispenser 100 is a substantially spherical, one-piece molded construction formed from elastomeric material that may include at least one of natural rubber, synthetic rubber, or a combination of natural rubber and one of a group of blending polymers consisting of butadiene rubber, styrene-butadiene rubber, nitrile rubber, and ethylene-propylene-dienemonomer rubber. The treat dispenser 100 may also be formed from multiple parts that are welded, sonically welded, or otherwise joined together. While other shapes and materials may be used, it is preferable that the treat dispenser 100 is flexible and resilient enough so that it is capable of rolling and bouncing and so that the second wall portion 105 and/or the dividing wall 130 is capable of being deformed to apply compression to the second chamber 120 in order to generate a sound from the sound device 200. In addition, the ribs 116 that form the skeletal framework 112 of the first chamber are advantageously strong enough to resist tearing that might result from a pet chewing on the framework 112 in order to access treats. In addition, the material that forms the opening occlusion 119 and the occlusions 127 is sufficiently thick that it advantageously resists tearing or puncturing. Thus, it is advantageous for the opening occlusions 119, 127 to be molded with the skeletal framework 112, 122 to form a one-piece construction that imparts strength and connectivity with the surrounding ribs 116, 126 and resists a breach in integrity of the framework.

As shown in FIGS. 7-8, the interior 124 of the second chamber 120 is preferably substantially hollow to accommodate the sound device 200. The sound device 200 has an inlet 210 spaced from the dividing wall 130 and an outlet 220, with the outlet 220 being disposed generally within the opening 129 of the skeletal framework 122. The sound device 200 is depicted as being arranged along the central axis 105 of the treat dispenser 100 and may be, for example, a squeaker that is mounted within the opening 129 and may be in accordance with any one of U.S. Pat. Nos. 7,066,779, 7,736,212, 7,736, 213, and 7,833,079, the contents of each of which are incorporated herein by reference. The sound device 200 produces a sound when air is forced under pressure from the inlet 210 and through the outlet 220, usually in response to compression of the second chamber 120 by chewing by an animal or hand compression from a user.

The sound device 200 may also be activated by a force 230 applied against the dividing wall 130 from within the first chamber 110 in the direction of the second chamber 120, as shown in FIG. 8. More specifically, in the illustrated embodiment, a portion of the dividing wall 130 advantageously has a region of reduced thickness 136 (FIG. 7) that is thinner than the thickness 138 (FIG. 7) of the dividing wall 130 adjacent the junction 115 of the chambers 110, 120. The region of reduced thickness 136 advantageously reduces the force needed to deform the dividing wall 130 adjacent the sound device 200 and facilitates movement of the dividing wall 130 toward the sound device 200. Such movement forces air within the interior 124 and adjacent the dividing wall 130 into the inlet 210 and results in a sound (represented schematically at the numeral 250 in FIG. 8) from the outlet 220. The reduced thickness 136 also forms a depression 139 that extends in a direction generally away from the first chamber 110 and that is similar in shape to a shallow dish that enlarges the interior 114 of the first chamber 110 in the area of the dividing wall 130 for receiving more treats (not shown). While a reduced thickness 136 is illustrated adjacent the first chamber 110, it will be appreciated that a reduced thickness may also be present (not shown) adjacent the second chamber 120, or it may be omitted altogether (not shown).

In use, the treat dispenser 100 is filled with treats by the user manually deforming one or more of the openings 118 to receive one or more the of the treats through such openings 118 and into the interior 114. Such deformation may be as to the shape of the openings 118 or the size of the openings 118 or both. The openings 118 are shaped or sized or both to retain the treats within the interior 114 until sufficient deformation of the treat dispenser by an animal causes one or more of the treats, or portions thereof, to be received through the openings 118 to the exterior of the treat dispenser 100 whereupon the treats or the portions or fragments thereof can be consumed by the animal. It is noted, however, that the treats can be configured to more easily dispensed from the interior 114, and the treats and or the treat dispenser can be configured such that the treats freely fall through the openings 118 when the treat dispenser is in a free and undeflected state.

As a pet plays with and rolls the treat dispenser 100, treats (not shown) or portions thereof are gradually dispensed through the openings 118 from the first chamber 110 and onto the floor or ground for the pet to consume. The openings 180 are sized to retain the treats within the interior 114 and to enable the treats or the portions thereof to be dispensed from the interior 114 through the openings 118 by the pet chewing upon the skeletal framework 112 of the first chamber 110, which results in the treats being broken into smaller pieces that might more easily fall through the openings 118. Furthermore, as the pet continues to roll and play with the treat dispenser 100, treats may be automatically dispensed through the openings 118, which interests the pet to continue to play with the treat dispenser 100 in seeking to extract more treats from within the interior 114. In addition, the skeletal framework 112 creates a soft, chewable and flexible barrier that avoids the animal having direct access to the interior 114. This allows the pet to see the treats within the interior 114 even though the pet cannot consume the treats until they fall through openings 118 in the framework 112. All the while, the treat dispenser 100 is producing a sound in response to a pet chewing upon the treat dispenser 100 and/or in response to the treat dispenser 100 bouncing on a surface or otherwise being squeezed by a human user during play. Once all of the treats are dispensed from within the interior 114, the treat dispenser 100 becomes a rolling, flexible, chewable, noise making toy for the pet to enjoy separate and apart from the treats.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof Additionally, it is intended that such equivalents include both currently known equivalents as well as equivalents developed in the future, i.e., any elements developed that perform the same function, regardless of structure.

What is claimed is:

1. A treat dispenser for an animal and comprising:
  a body formed at least in part of a resilient material and comprising a first wall portion, a second wall portion, and a dividing wall situated generally between the first and second wall portions, the body having faulted therein a first chamber disposed generally between the first wall portion and the dividing wall, the body further having formed therein a second chamber disposed generally between the second wall portion and the dividing wall;
  the first wall portion having formed therein at least a first opening that is structured to be resiliently deformable and to receive at least a first animal foodstuff therethrough, the first chamber being structured to receive the at least first foodstuff therein;
  at least a portion of at least one of the second wall portion and the dividing wall being structured to be deformable to cause a deformation of the second chamber; and
  a sound device that is structured to output a sound responsive to the deformation of the second chamber, the sound being audible to at least one of a human and an animal.

2. The treat dispenser of claim 1 wherein the sound device is disposed on at least one of the second wall portion and the dividing wall and is structured to output the sound responsive to air movement due to the deformation of the second chamber.

3. The treat dispenser of claim 1 wherein the dividing wall has a first region and a second region, the first region being of a first thickness, and second region being of a second thickness different from the first thickness.

4. The treat dispenser of claim 1 wherein the first wall portion has formed therein a plurality of openings that comprise the at least first opening, at least some of the plurality of openings being structured to be resiliently deformable and to receive one or more animal foodstuffs therethrough.

5. The treat dispenser of claim 4 wherein the second wall portion has situated on an exterior surface thereof a plurality of visual elements having an appearance that is approximately a mirror image of the plurality of openings.

6. The treat dispenser of claim 5 wherein the plurality of visual elements comprise a plurality of indentations formed on the exterior surface.

7. The treat dispenser of claim 4 wherein the second wall portion has formed therein an aperture, at least a portion of the sound device being disposed in the aperture.

8. The treat dispenser of claim 7 wherein the second chamber is substantially free of openings except for the aperture.

9. The treat dispenser of claim 1 wherein the first and second wall portions each have an exterior surface that is semi-spherical in shape.

10. The treat dispenser of claim 9 wherein the dividing wall comprises a protruding portion that protrudes radially beyond the exterior surfaces of the first and second wall portions.

11. The treat dispenser of claim 10 wherein the protruding portion is elongated and extends along at least a portion of the circumference of the body at the periphery of the dividing wall.

* * * * *